G. M. & C. C. Richardson.
Horse Rake.
No. 89,169. Patented April 20, 1869.
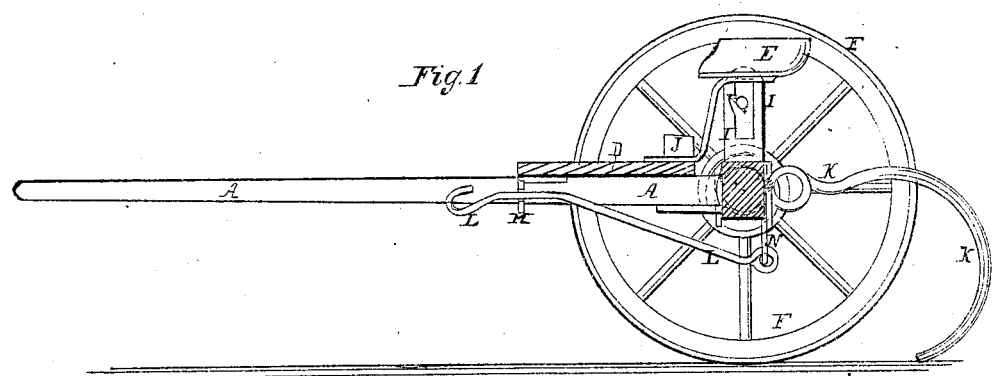
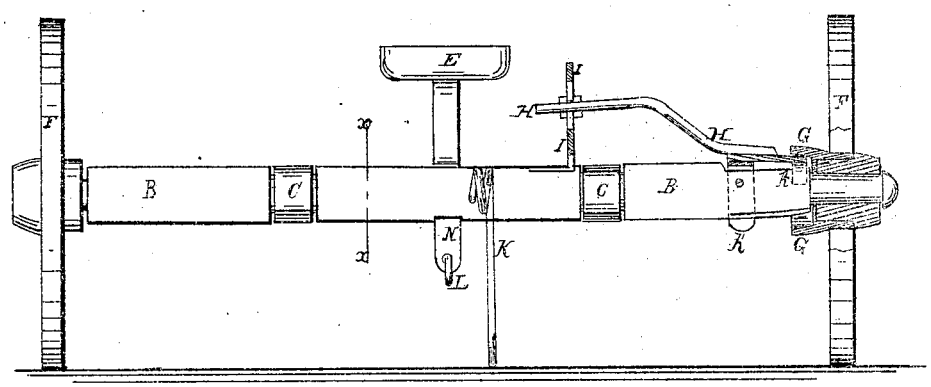
WITNESSES
E. Wolff
Wm A Morgan
INVENTORS
George M. Richardson
Charles C. Richardson
pr. Munn & Co
Attorneys

UNITED STATES PATENT OFFICE.

GEORGE M. RICHARDSON AND CHARLES C. RICHARDSON, OF DANA, MASS.

IMPROVEMENT IN HORSE-RAKES.

Specification forming part of Letters Patent No. 89,169, dated April 20, 1869.

*To all whom it may concern:*

Be it known that we, GEORGE M. RICHARDSON and CHARLES C. RICHARDSON, of Dana, in the county of Worcester and State of Massachusetts, have invented a new and useful Improvement in Horse-Rakes; and we do hereby declare that the following is a full, clear, and exact description thereof, which will enable others skilled in the art to make and use the same, reference being had to the accompanying drawings, forming part of this specification.

Figure 1 is a detail vertical section of our improved rake, taken through the line $x$ $x$, Fig. 2. Fig. 2 is a detail rear view of the same, parts being broken away to show the construction.

Similar letters of reference indicate corresponding parts.

Our invention has for its object to furnish an improved horse hay-rake, which shall be simple in construction, easily operated, and effective in operation; and it consists in the construction and combination of the various parts by means of which the rake is operated to discharge the collected hay, as hereinafter more fully described.

A are the thills, to the rear ends of which the axle B is connected by straps C, attached to the said rear ends of the thills, and passing around the said axle in grooves formed for their reception, or by an equivalent device, in such a way that the axle B may revolve, or partially revolve, in its bearings. D is a platform, attached to the rear part of the thills A, and by which the driver's seat E is supported. F are the wheels, which are placed and revolved upon the axle B, in the ordinary manner. The inner end of the hub of one or both the wheels F is formed with a projecting band or flange, G, or has a cup-shaped recess formed in it, as shown in Fig. 2.

H is a lever, which is pivoted to the axle B by means of the ears or straps $h^1$, formed upon the said lever H, as shown in Fig. 2. Upon the outer end of the lever H is formed, or to it is attached, a block or shoe, $h^2$, fitting upon the inner or concave surface of the band or flange G, so that the said axle may be carried around by the revolution of the said wheel, the lever H and band G acting as a friction-clutch.

The inner end of the lever H passes through the slotted guide-arm I, and extends inward into such a position as to be readily reached and operated by the driver from his seat.

The lever H is provided with a catch which takes hold of a notch formed in the slotted arm I, to hold the block $h^2$ in contact with the band or flange G of the wheel F. The lower end of the slotted guide-arm I is securely attached to the axle B, and said arm may have another notch formed in it, into which the lever H may catch to hold the block $h^2$ away from the flange of the wheel F.

J is a stop or arm, attached to the platform C or thills A, in such a position that as the axle B is revolved by the wheel F, the lever H may strike against the stop J, and be lifted out of the notch in the slotted arm I, allowing the friction-block $h^2$ to drop away from the band of the wheel F, and allowing the rake-teeth to drop to the ground to again gather the hay.

K are the rake-teeth, which are securely attached to the rear side of the axle B, and which are formed with a coil or bend near the axle B, as shown in Figs. 1 and 2, so that they may spring or twist to pass any obstruction against which they may strike, each tooth, in this respect, acting independently of the others.

L is the draft-bar, which passes through a guide or support, M, attached to the forward part of the platform D, and the rear end of which is pivoted to an arm or lever, N, the upper end of which is securely attached to the axle B. By this arrangement of the draft-bar, the draft-strain is made to hold the rake-teeth down to the ground in working position, and is also made to bring the rake-teeth to the ground quickly when the lever H is disengaged by the stop J.

Having thus described our invention, we claim as new and desire to secure by Letters Patent—

The combination of the band or flange G, lever H $h^1$ $h^2$, and slotted arm I, with each other, and with the axle B and wheel F, substantially as herein shown and described, and for the purpose set forth.

The above specification of our invention signed by us this 28th day of August, 1868.

GEO. M. RICHARDSON.
CHARLES C. RICHARDSON.

Witnesses:
WM. H. BALCOM,
NATHAN S. JOHNSON.